Feb. 26, 1929.                                                          1,703,736
A. P. JACOB
MEASURING INSTRUMENT
Filed Dec. 10, 1926

Alfred P. Jacob
INVENTOR

WITNESS:   BY  Victor J. Evans
ATTORNEY

Patented Feb. 26, 1929.

1,703,736

UNITED STATES PATENT OFFICE.

ALFRED P. JACOB, OF NEW YORK, N. Y.

MEASURING INSTRUMENT.

Application filed December 10, 1926. Serial No. 153,921.

This invention relates to improvements in measuring instruments and has particular reference to an instrument for finding the center of an object or figure.

The primary object of the invention resides in an instrument which may be quickly adjusted to the object to be measured, and when so adjusted, the same will visibly indicate the exact center of the same without necessitating the use of mathematics in so finding the same.

Another object of the invention is to provide a measuring instrument which is automatic and accurate in its findings and which will not become easily damaged through rough usage as it will be appreciated that most measuring instruments are very delicate in their construction and operation.

A still further object of the invention resides in a combined center finder and calipers, which may be used for respectively finding the exact center of the object and also the exact thickness of the same.

A still further object of the invention is to provide a measuring instrument of the type above mentioned which is simple in construction, easy of operation and inexpensive of manufacture.

With these and other objects in view, the invention resides in certain novel construction, combination and arrangement of parts, the essential features of which are hereinafter fully described, are particularly pointed out in the appended claims, and are illustrated in the accompanying drawing, in which:

Figure 1:
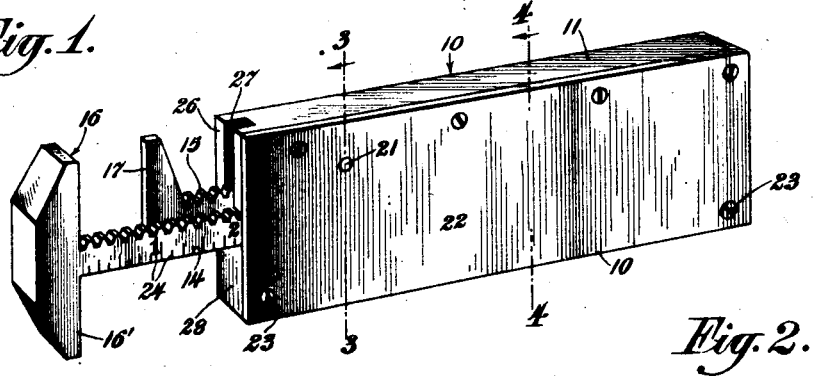
Figure 1 is a perspective view of my improved measuring instrument.
Figure 2:
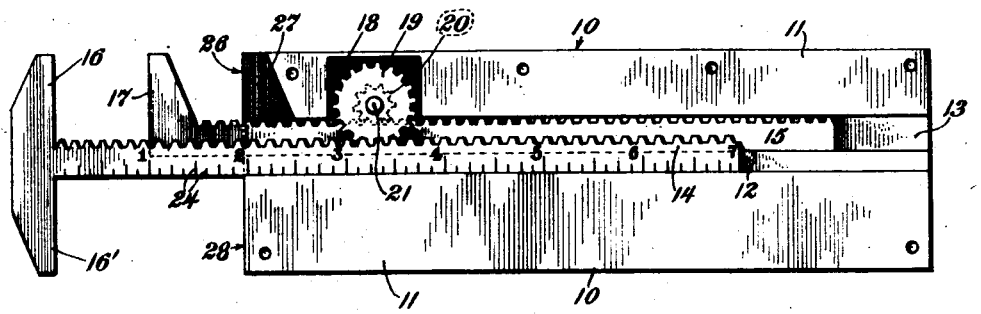
Figure 2 is an elevational view of the same with the cover plate removed.
Figures 3, 4, 5:
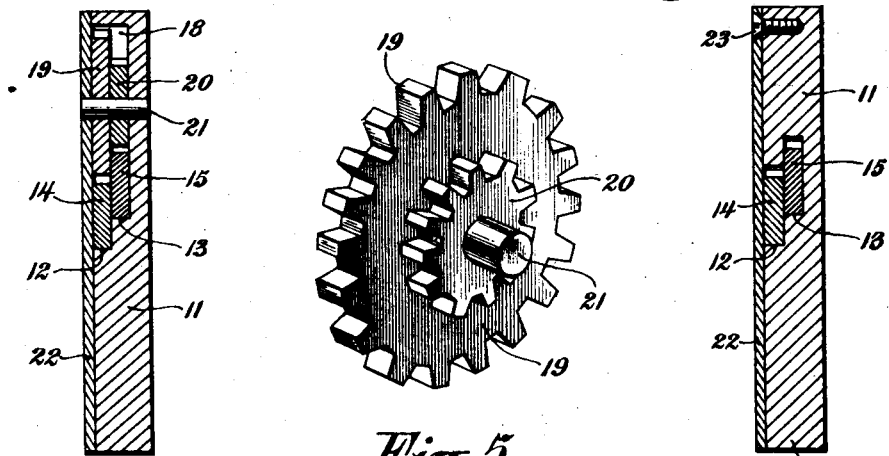
Figure 3 is a vertical transverse sectional view on the line 3—3 of Figure 1.
Figure 4 is a vertical transverse sectional view on the line 4—4 of Figure 1.
Figure 5 is a detail perspective view of the pinion wheels.

Referring more particularly to the drawing, the reference numeral 10 designates my improved measuring instrument in its entirety and which includes an elongated body 11 having recesses or grooves 12 and 13 provided therein and which extend the length of said body. The recess 12 is provided in the top face of the body while the recess 13 is disposed to one side of and overlaps the same, but communicates therewith for a purpose to be explained.

Rack bars 14 and 15 are slidably mounted in the respective recesses 12 and 13 and are movable out of one of the ends of said body. The outer end of the rack bar 14 carries jaws 16 and 16', these jaws being disposed respectively on opposite sides of the longitudinal axis of said rack bar with the noses of the jaws terminating in alignment with the longitudinal side edges of the body 11. The rack bar 15 carries a single jaw 17 at the outer end thereof for co-action with the jaw 16 for a purpose to be presently explained.

Disposed within the recess 18 provided in the body 11 are pinions 19 and 20 for respective engagement with the teeth of the rack bars 14 and 15. The pinions are of different sizes and their ratio with respect to each other is two to one, the pinion 19 being twice the size of the pinion 20 so as to move the rack bar 14 at twice the speed of the rack bar 15. The pinions are keyed or fixedly mounted on a shaft 21 which has its ends journalled in the body 11 and in a cover plate 22 which covers one side of the body. Screws or like fastening elements 23 pass through the cover plate and into the body 11 for removably securing the cover plate thereon.

The rack 14 is provided with graduations 24 which co-act with the end wall of the body when extended therefrom to indicate the distance between the inner face of the jaws 16 and the end of said body. The graduations 24 on the rack bar may be indicative of inches and fractions thereof or any other scale used for measuring thicknesses.

In operation of the device, we shall presume that it is desired to find the center of an object of any width, the operator grasps the body of the instrument with one hand and pulls out upon the rack 14 with his other hand until the jaw 16 and the face 26 of the body 11 spans the object, at which time the graduation 24 on the rack bar which is indicative of the width of the object is in alignment with the end of the body, this giving the exact width of the object. As the rack bar 14 moves outward, the pinion 19 is rotated which causes rotation of the pinion 20 which imparts a slow outward sliding movement to the rack bar 15 causing the same to move outward at one-half speed of the rack bar 14. When the rack bar 14 stops moving, the outer face of the jaw 17 is in the exact center between the face 26 of the body and the jaw 16, thus indicating the exact center of the object being measured.

For finding the center of a circle with my instrument it is only necessary to adjust the jaw 16 with respect to the face 26 as hereinbefore described so that the same touch the circle at diametrically opposite points after which a mark is placed within the circle at the point where the jaw 17 stops. The instrument is then shifted about the circle and another mark placed within the same to cross the first mark. The point of intersection of the two marks represent the exact center of the circle.

When the racks 14 and 15 are at the limit of their inward movement, the jaw 17 is disposed in a recess 27 so that the outer face of the jaw lies flush with the edge of the body to permit the jaws 16 and 16' to abut the end of the body.

Should it be desired to use the instrument as calipers, the jaw 16' co-acts with the face 28 of the body for spanning the thickness of the object being measured, which thickness is indicated by the co-action of the indicating marks 24 with the end of the body 11.

The instrument may be constructed of any suitable light material so as to permit the same to be conveniently carried in the pocket of a user. In constructiong the same the body 11 may of bass-wood or the like while the cover plate 22 may be of metal. The racks 14 and 15 should always be of metal with the scale impressed in the rack 14.

From the foregoing description, it will be seen that I have provided a measuring instrument which may be quickly adjusted to the size of an object, and when adjusted the exact center of the object is found. The instrument finds the center without requiring the knowledge of mathematics and may be used by persons not well versed therein.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A measuring instrument comprising a body, a pair of rack bars slidably mounted within said body and movable through one end thereof, a jaw carried by the outer end of each rack bar, a pair of pinions of different ratios journalled within said body on the same axis and movable together for co-action with the respective rack bars, substantially as and for the purpose specified.

2. A measuring instrument comprising a body having longitudinal recesses therein, rack bars slidably mounted in the respective recesses, a jaw on each of said rack bars, a pair of pinions of different ratios journalled within said body on the same axis and movable together for co-action with the respective rack bars for moving the same at different rates of speed, a scale provided on one of said rack bars for co-action with one end of said body for indicating the distance of movement of said rack bars out of said body.

3. A measuring instrument comprising a body having longitudinal recesses therein, rack bars slidably mounted in the respective recesses, a single jaw on one of said rack bars, a double jaw on the other of said rack bars, a pair of pinions of different ratios journalled within said body on the same axis and movable together for co-action with the respective rack bars for moving the same at different rates of speed, and a scale provided on the last mentioned rack bar for co-action with said single jaw for indicating the distance of movement of said rack bar out of said body.

4. A measuring instrument comprising a body, a pair of rack bars slidably mounted therein and movable through one end thereof, a single jaw fixed to the outer end of one of said rack bars and movable into a recess in said body when in a fully retracted position, a double jaw fixed to the outer end of the other of said rack bars and adapted to fit against the body when in a fully retracted position, a pair of pinions of different ratios journalled within said body and constantly meshing with said rack bars, the pinion meshing with the rack bar carrying the single jaw being one-half the gear ratio of the other pinion meshing with the rack bar carrying the double jaw, whereby the single jaw rack bar moves at half the rate of speed to that of the double jaw rack bar during extension and retraction of the same.

5. A measuring instrument comprising a body, a pair of rack bars slidably mounted therein and movable through one end thereof, a single jaw fixed to the outer end of one of said rack bars and movable into a recess in said body when in a fully retracted position, a double jaw fixed to the outer end of the other of said rack bars and adapted to fit against the body when in a fully retracted position, a pair of pinions of different ratios journalled within said body and constantly meshing with said rack bars, the pinion meshing with the rack bar carrying the single jaw being one-half the gear ratio of the other pinion meshing with the rack bar carrying the double jaw, whereby the single jaw rack bar moves at half the rate of speed to that of the double jaw rack bar during extension and retraction of the same and a scale provided on said last mentioned rack bar for co-action with one end of said body to indicate the distance between the end of said body and said double jaw, and for co-action with said single jaw for indicating one-half the distance therebetween.

In testimony whereof I affix my signature.

ALFRED P. JACOB.